(12) United States Patent
Tang et al.

(10) Patent No.: US 12,447,809 B2
(45) Date of Patent: Oct. 21, 2025

(54) VEHICLE AND POWER BATTERY INSTALLATION STRUCTURE THEREOF

(71) Applicant: GUANGZHOU AUTOMOBILE GROUP CO., LTD., Guangzhou (CN)

(72) Inventors: Zhijian Tang, Guangzhou (CN); Feng Liang, Guangzhou (CN)

(73) Assignee: GUANGZHOU AUTOMOBILE GROUP CO., LTD., Guangzhou (CN)

(*) Notice: Subject to any disclaimer, the term of this patent is extended or adjusted under 35 U.S.C. 154(b) by 461 days.

(21) Appl. No.: 18/013,529

(22) PCT Filed: Jun. 12, 2021

(86) PCT No.: PCT/CN2021/099910
§ 371 (c)(1),
(2) Date: Dec. 28, 2022

(87) PCT Pub. No.: WO2022/001642
PCT Pub. Date: Jan. 6, 2022

(65) Prior Publication Data
US 2023/0291050 A1    Sep. 14, 2023

(30) Foreign Application Priority Data

Jun. 30, 2020 (CN) .......................... 202010617932.6

(51) Int. Cl.
*B60K 1/04*  (2019.01)
*B62D 25/20* (2006.01)
(Continued)

(52) U.S. Cl.
CPC ................ *B60K 1/04* (2013.01); *B62D 25/20* (2013.01); *B62D 25/2027* (2013.01);
(Continued)

(58) Field of Classification Search
CPC .... B62D 25/2027; B62D 25/20; B62D 21/02; B60K 1/04; B60K 2001/0438;
(Continued)

(56) References Cited

U.S. PATENT DOCUMENTS

| | | | |
|---|---|---|---|
| 7,503,585 B2 * | 3/2009 | Hashimura | B60K 15/063 280/783 |
| 11,034,229 B2 * | 6/2021 | Kosuge | B60L 50/64 |

(Continued)

FOREIGN PATENT DOCUMENTS

| | | | | |
|---|---|---|---|---|
| CN | 104908566 A | * | 9/2015 | |
| CN | 210852666 U | * | 6/2020 | |
| EP | 2505459 A1 | * | 10/2012 | ............... B60K 1/04 |

*Primary Examiner* — Amy R Weisberg
*Assistant Examiner* — Denise Lynne Esquivel
(74) *Attorney, Agent, or Firm* — ScienBiziP, P.C.

(57) ABSTRACT

A vehicle and a power battery installation structure are provided, each includes a rear longitudinal beams; a lower crossbeam with ends connecting the rear longitudinal beams; an upper crossbeam with ends connecting the rear longitudinal beams, the upper crossbeam and the lower beam arranged in sequence from front to rear of a vehicle; and a power battery installation plate below the upper crossbeam and connecting the upper crossbeam, the rear end of the power battery installation plate connected to the lower crossbeam. Load received by the power battery installation plate may be transmitted along two paths, so that the crossbeam structure of the vehicle body is more evenly stressed. The power battery installation plate may be modified to match different battery structures, thus increasing efficiency of vehicle model development and use rate of components.

16 Claims, 7 Drawing Sheets

(51) Int. Cl.
*H01M 50/249* (2021.01)
*H01M 50/262* (2021.01)

(52) U.S. Cl.
CPC ....... *H01M 50/249* (2021.01); *H01M 50/262* (2021.01); *B60K 2001/0438* (2013.01)

(58) Field of Classification Search
CPC ........ B60K 2001/0416; H01M 50/249; H01M 50/262; H01M 2220/20; B60L 50/66
USPC ....................................... 296/193.01, 193.08
See application file for complete search history.

(56) References Cited

U.S. PATENT DOCUMENTS

| | | | |
|---|---|---|---|
| 2019/0276080 A1* | 9/2019 | Otoguro .................. | B60K 1/04 |
| 2020/0070671 A1* | 3/2020 | Ohkuma .................. | B60K 1/04 |
| 2021/0339617 A1* | 11/2021 | Ohkuma ............. | H01M 50/242 |
| 2021/0362786 A1* | 11/2021 | Kim .................. | B62D 25/2036 |

* cited by examiner

VEHICLE AND POWER BATTERY INSTALLATION STRUCTURE THEREOF

FIELD

The present disclosure herein generally relates to vehicles, and more particularly, to a vehicle and a power battery installation structure of the vehicle.

BACKGROUND

At present, due to relatively small impact on an interior space of the vehicle, the mainstream design scheme is to arrange a power battery of a vehicle powered by renewably energy below a floor of a lower vehicle body. With continuous demand for greater mileage and endurance, a longitudinal size of the battery continues to increase, so the battery is commonly extended from the front floor to a second row of seats.

In related art, when designing an installation position of the power battery, the installation position is generally set on a lower crossbeam. The lower crossbeam is connected to longitudinal beams at its two respective ends to form an H-shaped force transmission path. The single force transmission path is required to support very heavy load. The overall reliability of the vehicle is thus low. Moreover, limited by layout considerations of the module and the rear suspension, an end of the battery may be not aligned with or sometimes far away from the crossbeam in actual use. An adapter bracket is thus needed to install the battery body to the crossbeam. However, the added adapter bracket may become a cantilever structure and in a poor stress state. Thus, the crossbeam needs to be moved forward, but the crossbeam and the rear suspension installation point are staggered from each other, so the frame of the vehicle body is not conducive to bearing impact loads from the suspension. In addition, if the structure of the vehicle model changes, the position of the crossbeam also need to be changed, and the original structure for the power battery needs to be modified to match the new position of new crossbeam. The overall redesigning time maybe long.

SUMMARY

A need therefore exists in the present disclosure for a vehicle and a power battery installation structure of the vehicle, which provide more paths for the power battery to transmit the load, improve the service reliability, and shorten upgrading and transformational cycles for the vehicle model.

To achieve the above object, the present disclosure provides a power battery installation structure, including:

a rear longitudinal beam;

a lower crossbeam connected to the rear longitudinal beam by respective ends of the lower crossbeam;

an upper crossbeam connected to the rear longitudinal beam by respective ends of the upper crossbeam, the upper crossbeam and the lower crossbeam being arranged in sequence in a direction from a front to a rear of a vehicle; and a power battery installation plate disposed below the upper crossbeam and connected to the upper crossbeam, a rear end of the power battery installation plate being connected to the lower crossbeam.

Optionally, the power battery installation plate includes a mounting surface facing a rear and lower side of the vehicle, and the mounting surface defines a mounting hole configured for mounting a power battery.

Optionally, a protrusion and an inner cavity are provided on the power battery installation plate by recessing the power battery installation plate downward, and the mounting surface is a side surface of the protrusion.

Optionally, a reinforcing plate is provided inside the mounting hole, and the reinforcing plate is attached to an inner wall of the inner cavity.

Optionally, the power battery installation plate defines a mounting hole, and a flange nut is connected inside the mounting hole, and the flange nut is coaxially with the mounting hole.

Optionally, a reinforcing rib is provided on the power battery installation plate, the reinforcing rib extends from the mounting hole to the lower crossbeam.

Optionally, mounting points configured for mounting a rear seat belt and/or a rear seat are provided on the power battery installation plate.

Optionally, longitudinal cross-sections of the upper crossbeam and the lower crossbeam are Ω-shaped.

Optionally, the lower crossbeam is connected to connecting plates by the respective ends of the lower crossbeam, and the lower crossbeam is connected to the rear longitudinal beam by the connecting plates.

To achieve the above object, the present disclosure also provides a vehicle including the power battery installation structure mentioned above.

After the power battery is mounted on the power battery installation plate in the present disclosure, the load received by the power battery installation plate is transmitted along two paths when the power battery is in the stressed state. Firstly, the load is transversely transmitted through the upper crossbeam to the rear longitudinal beam, which is connected to both ends of the upper crossbeam. Secondly, the load is transversely transmitted through the lower crossbeam to the rear longitudinal beam, since the rear end of the power battery installation plate is connected to the lower crossbeam. Thus, multiple load transmission paths are formed. The beam structure of the vehicle body is more evenly stressed, so the vehicle has better durability and driving stability. In addition, the power battery installation plate is provided so that the power battery can be better adapted to the position of the lower crossbeam of different models during installation. When upgrading and modifying the models subsequently, when the lower crossbeam is moved backward due to an increase of the wheelbase, the battery structure does not need to be extended. When developing low mileage models such as those used in online car hailing, the battery is small, and there is no need to move the lower crossbeam forward for matching. Instead, the power battery installation plate can be modified to achieve rapid matching, and the efficiency of model development and the utilization rate of components are improved.

DESCRIPTION OF REFERENCES OF THE DRAWINGS

Figure 1:
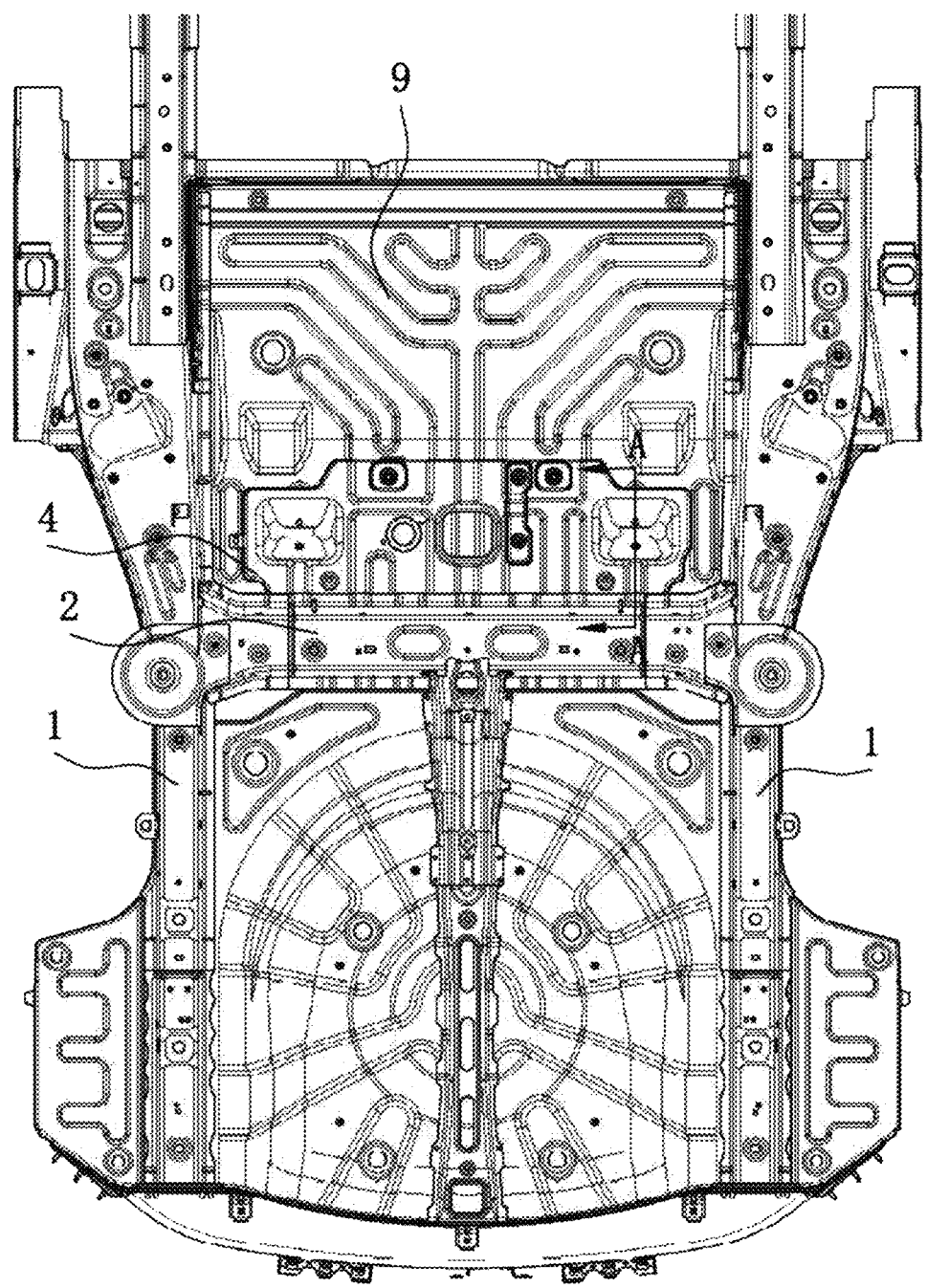
FIG. 1 is a bottom diagrammatic view of a power battery installation structure according to an embodiment of the present disclosure.

1, rear longitudinal beam; 2, lower crossbeam; 3, upper crossbeam; 4, power battery installation plate; 41, mounting surface; 42, mounting hole; 43, reinforcing rib; 5, reinforcing plate; 6, flange nut; 71, rear seat belt mounting point; 72, rear seat mounting point; 8, connecting plate; 9, floor panel; 10, power battery; 11, power battery adapter bracket; 12, axis of battery mounting tool.

DETAILED DESCRIPTION

The specific embodiments of the present disclosure will be described in further detail below in combination with the drawings and embodiments. The following examples are used to explain the present disclosure, but are not intended to limit the scope of the present disclosure.

In the description of the present disclosure, it should be noted that the orientation or positional relationship indicated by the terms "longitudinal", "lateral", "up", "down", "front", "rear", "left", "right", "bottom", "inner" and "outer" are based on the orientation or positional relationship of the vehicle, which is only for the convenience of describing and simplifying the description, and does not indicate or imply that the device or element referred to must have a specific orientation or operated in a specific orientation, and therefore cannot be understood as limiting the present disclosure.

Referring to FIGS. 1 to 7, an embodiment of a power battery installation structure is provided, which includes: a rear longitudinal beam 1, a lower crossbeam 2, an upper crossbeam 3, and a power battery installation plate 4. Both ends of the lower crossbeam 2 are connected to the rear longitudinal beam 1. Both ends of the upper crossbeam 3 are connected to the rear longitudinal beam 1, and the upper crossbeam 3 and the lower crossbeam 2 are arranged in sequence along a direction from the front to the rear of the vehicle. The power battery installation plate 4 is disposed below the upper crossbeam 3 and fixed to the upper crossbeam 3. The rear end of the power battery installation plate 4 is fixed to the lower crossbeam 2.

According to the present disclosure, after the power battery 10 is mounted on the power battery installation plate 4, when the power battery 10 is in a stressed state, the load received by the power battery installation plate 4 is transmitted along two paths. Firstly, the load is transmitted through the upper crossbeam 3 to the rear longitudinal beam 1, which is connected to both ends of the upper crossbeam 3. Secondly, the load is transmitted through the lower crossbeam 2 to the rear longitudinal beam 1, since the rear end of the power battery installation plate 4 is connected to the lower crossbeam 2. The two load transmission paths result in stresses being more evenly distributed on the crossbeam structure of the vehicle body, and the vehicle has better durability and driving stability. In addition, the power battery installation plate 4 allows better adaptability of the power battery 10 to the position of the lower crossbeam 2 of different vehicle models during installation. When vehicle models are subsequently upgraded and modified, the entire battery structure does not need adjustment for different positions of the lower crossbeam 2. The efficiency of vehicle model development is improved because only the power battery installation plate 4 needs to be modified to fit into different vehicles.

Figure 4:
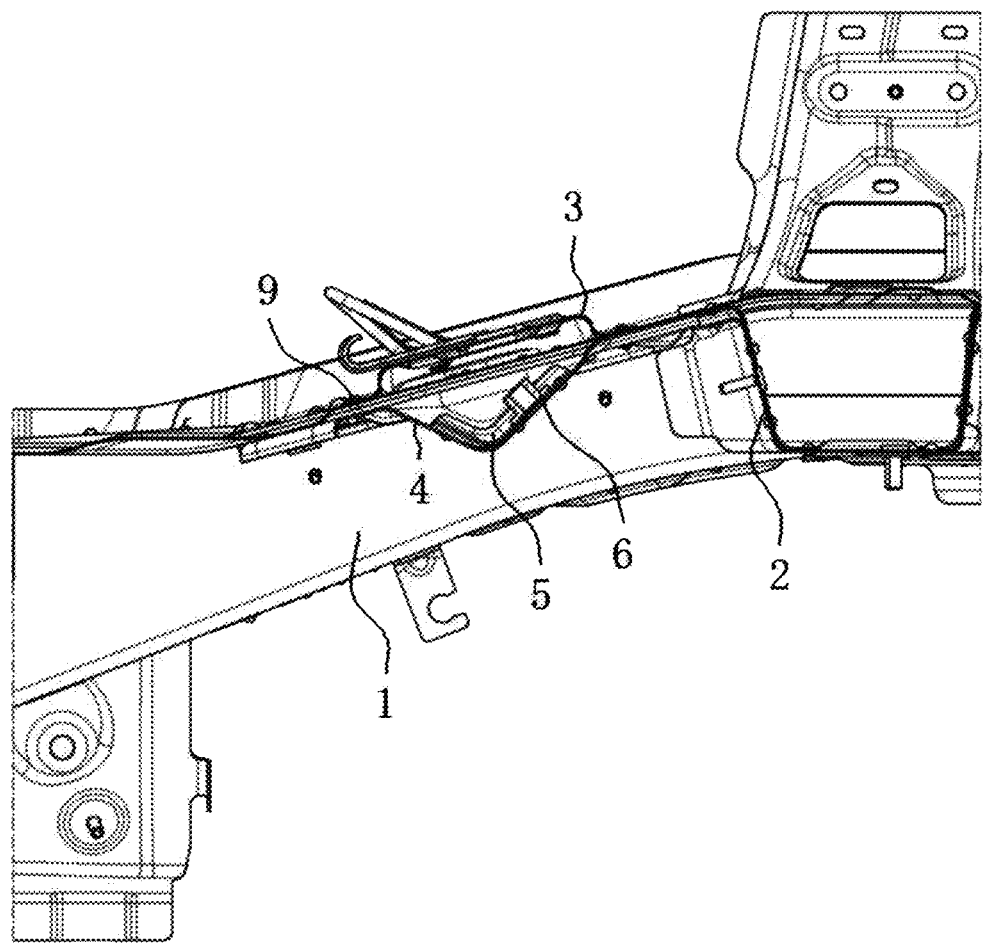
FIG. 4 is a cross-sectional view taken along A-A of FIG. 1.

Referring to FIGS. 1 and 4, a floor panel 9 is provided between the power battery installation plate 4 and the upper crossbeam 3 in this embodiment. The upper crossbeam 3, the floor panel 9, and the power battery installation plate 4 form a floor assembly, and are connected by soldering points.

Figure 6:
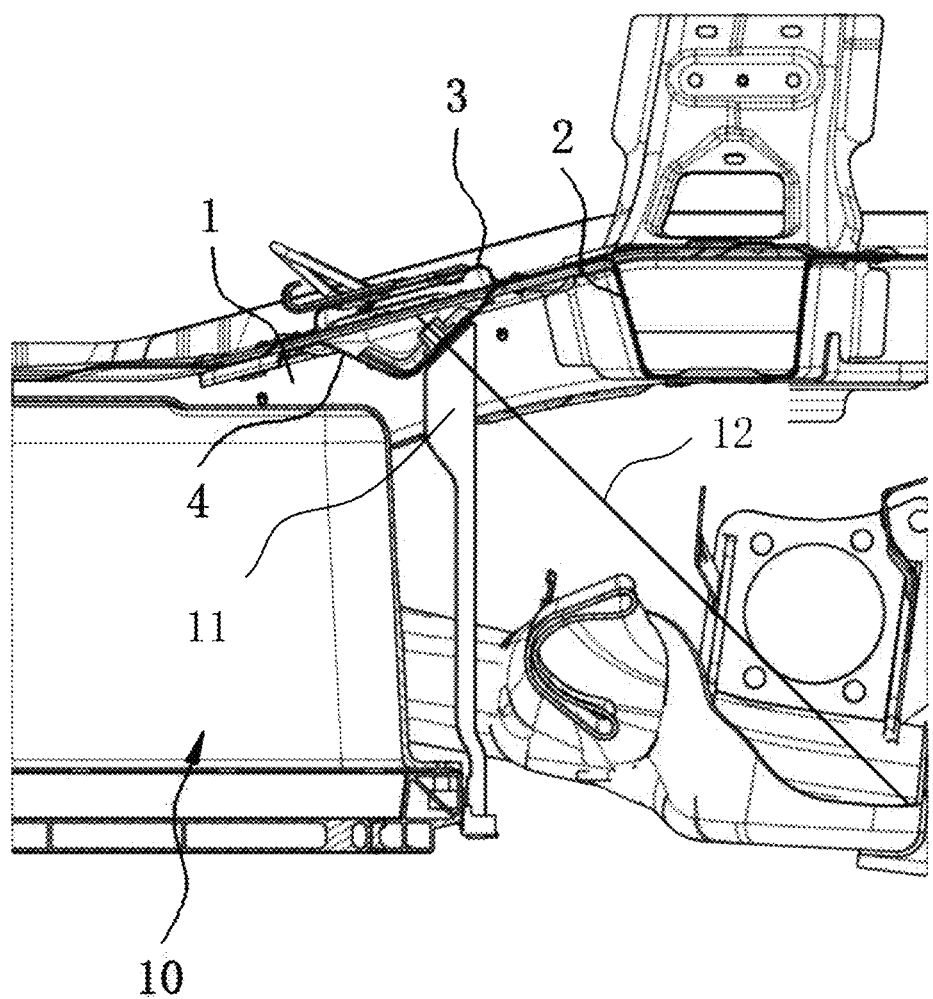
FIG. 6 is a diagrammatic view showing a mounted power battery according to an embodiment of the present disclosure.
Figure 7:
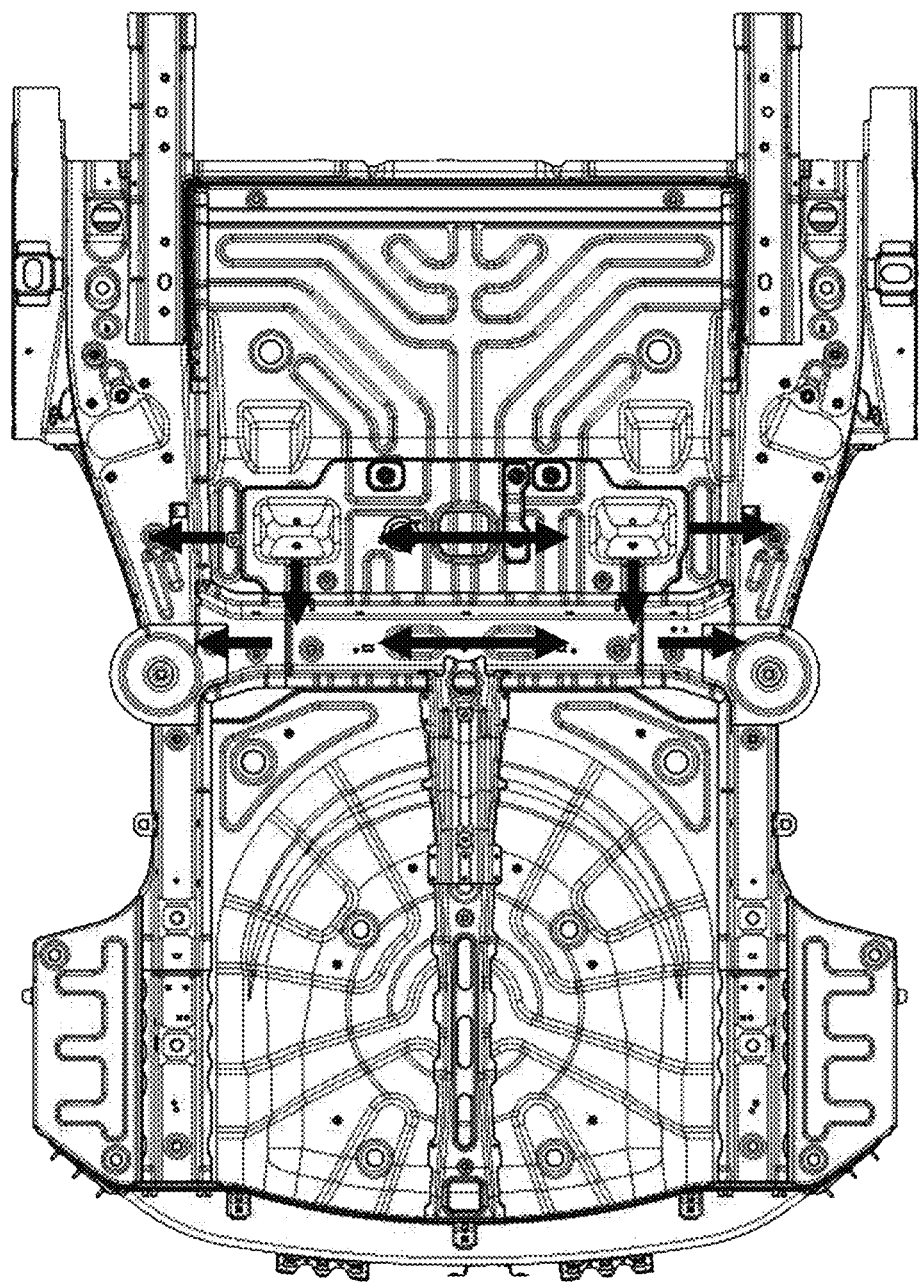
FIG. 7 is a diagrammatic view showing force transmission paths according to an embodiment of the present disclosure.

Referring to FIG. 6, furthermore, since the installation position of the power battery 10 is close to the suspension of the vehicle, in order to improve the production efficiency and accuracy, the power battery and the suspension are installed simultaneously. During installation, the power battery installation plate 4 and the power battery 10, when being installed along the vertical direction of the vehicle, are easy to be blocked by the suspension, and a tool cannot reach the installation position. Therefore, in this embodiment, the power battery installation plate 4 includes a mounting surface 41 facing the rear and lower side of the vehicle. A mounting hole 42 for mounting the power battery 10 is defined on the mounting surface 41. When assembling the power battery 10, the tool can be extended obliquely (i.e., in the direction of the axis 12 of the battery mounting tool shown in FIG. 6) to fasten the screw bolts, and the tool can be kept away from the suspension, thereby finishing the installation of the power battery adapter bracket 11 carrying the power battery 10 and the power battery installation plate 4.

In this embodiment, a protrusion and an inner cavity are provided on the power battery installation plate 4 by recessing the power battery installation plate 4 downward. A side of the protrusion forms the mounting surface 41. The inner cavity can conveniently receive the screw bolts penetrating into the mounting holes 42, thereby preventing the screw bolts from entering the passenger compartment above the floor panel.

Figure 5:
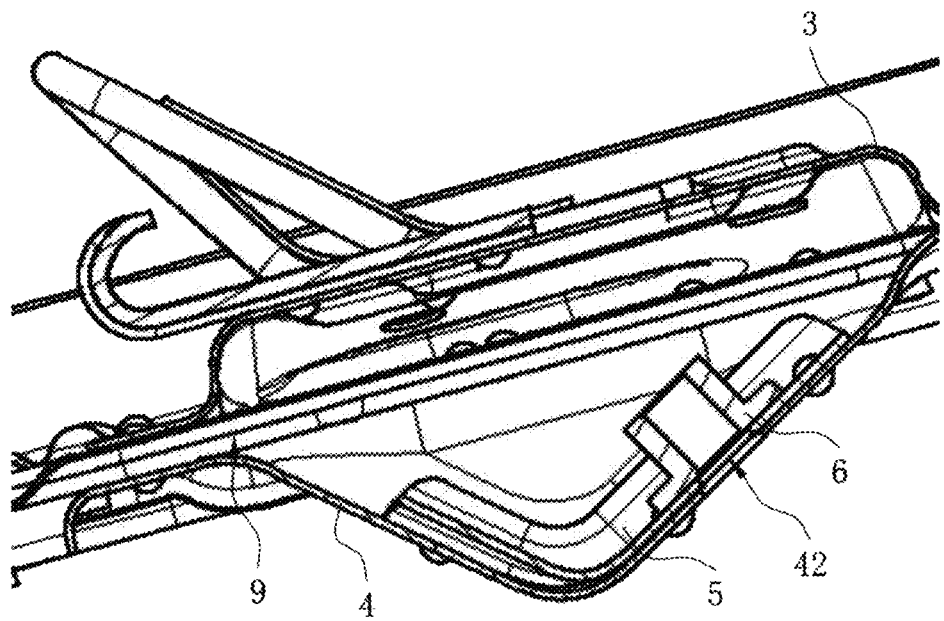
FIG. 5 is an enlarged partial view of FIG. 4.

Referring to FIG. 5, furthermore, in order to improve the strength of the local structure formed by the protrusion, a reinforcing plate 5 is provided on an upper end of the mounting hole 42 in this embodiment. The reinforcing plate 5 is attached to the inner wall of the inner cavity. Thus, cracking of the mounting hole 42 is avoided, and supplementary designs can also be implemented easily, such as lengthening and thickening of the reinforcing plate 5, to improve the strength of the local structure formed by the protrusion.

In some embodiments of the present disclosure, a flange nut 6 is fixed within the mounting hole 42 by soldering, being arranged coaxially with the mounting hole 42. The flange nut 6 has a head and a tail. The flange feature of the head is bonded to the reinforcing plate 5, and the diameter of the head is 1.5 to 2 times that of the tail. The flange nut 6 increases the contact surface for load transmission when the power battery 10 is connected to the battery installation plate 4, thereby improving the durability and reliability of the entire installation structure.

Figure 2:
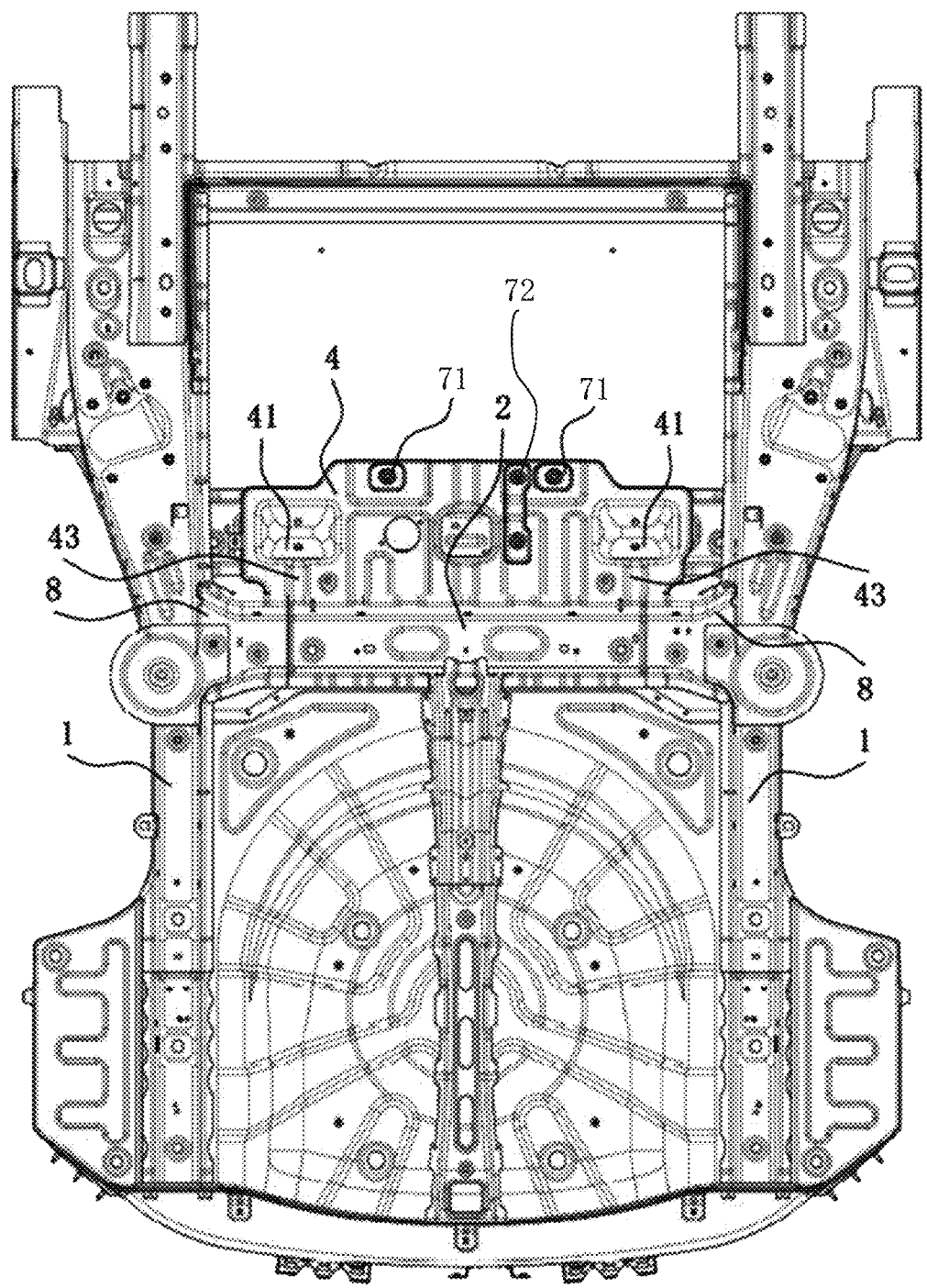
FIG. 2 is a bottom diagrammatic view of a portion of the power battery installation structure of FIG. 1.
Figure 3:
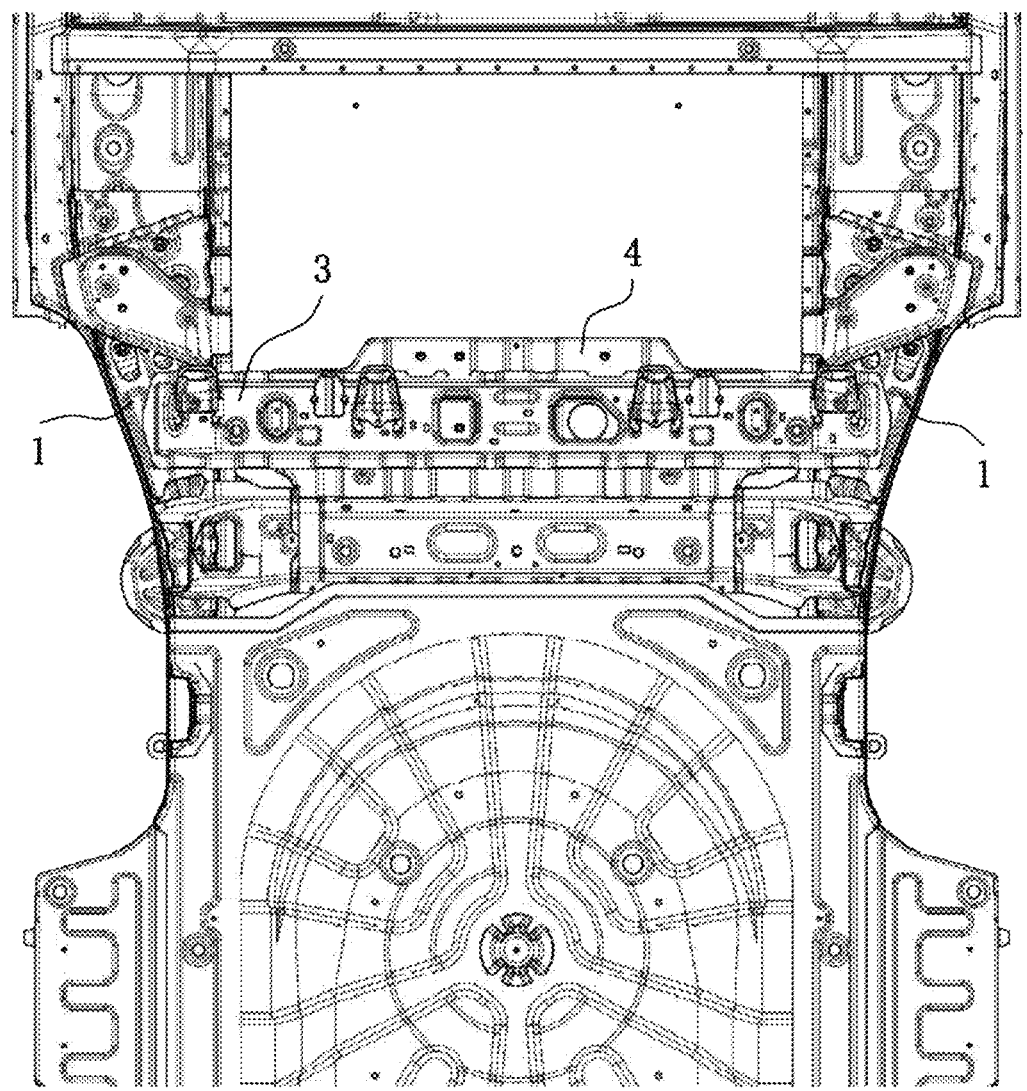
FIG. 3 is a top diagrammatic view of the power battery installation structure of FIG. 1.

Referring to FIG. 2, reinforcing ribs 43 are provided on the power battery installation plate 4. The reinforcing ribs 43 extend from the mounting holes 42 to the lower crossbeam 2. Thus, when the power battery installation plate 4 transmits load to the lower crossbeam 2, the transmission efficiency through the reinforcing ribs 43 is improved, and the strength of the power battery installation plate 4 is also improved.

In some embodiments of the present disclosure, in order to improve the functional integration of the structure and avoid the increase of structural components in the vehicle body, a protruding portion toward the front of the vehicle is provided on the power battery installation plate 4. The protruding portion includes a rear seat belt mounting point 71 for fixing the rear seat belt and a rear seat mounting point 72 for fixing the rear seat. Thus, the position for mounting the rear seat belt in the related art is covered, and it can be used to replace the existing rear seat belt installation plate.

Referring to FIGS. 2 and 4, the longitudinal cross-sections of the upper crossbeam 3 and the lower crossbeam 2 are all Ω-shaped. Thus, a better stress-bearing structure is formed, which can bear heavy load along the vertical direction, and is convenient in fitting and connecting to adjacent components by soldering.

In this embodiment, connecting plates 8 are connected to both ends of the lower crossbeam 2. The lower crossbeam 2 is connected to the rear longitudinal beam 1 through the connecting plates 8.

This disclosure also provides a vehicle, including the power battery installation structure described above. Rich and reliable load transmission paths are formed, which improve the overall service reliability of the vehicle.

To sum up, after the power battery 10 is mounted on the power battery installation plate 4 in the present disclosure, the load received by the power battery installation plate 4 is transmitted along two paths when the power battery 10 is in the stressed state. Firstly, the load is transversely transmitted through the upper crossbeam 3 to the rear longitudinal beam 1, which is connected to both ends of the upper crossbeam 3. Secondly, the load is transversely transmitted through the lower crossbeam 2 to the rear longitudinal beam 1, since the rear end of the power battery installation plate 4 is connected to the lower crossbeam 2. Thus, composite load transmission paths are formed. The beam structure of the vehicle body is more evenly stressed, so the vehicle has better durability and driving stability.

In addition, the power battery installation plate 4 is provided so that the power battery 10 can be better adapted to the position of the lower crossbeam 2 of different models during installation. When upgrading and modifying the models subsequently, when the lower crossbeam 2 is moved backward due to an increase of the wheelbase, the battery structure does not need to be extended. When developing low mileage models such as those used in online car hailing, the battery is small, and there is no need to move the lower crossbeam 2 forward for matching. Instead, the power battery installation plate 4 can be modified to achieve rapid matching, and the efficiency of model development and the utilization rate of components are improved.

By forming the mounting surface 41 facing the rear and lower side of the vehicle and providing the mounting hole 42 for mounting the power battery 10 on the mounting surface 41, the existing problems of the suspension blocking or impeding assembly of the power battery 10 are avoided.

Finally, the original components for mounting the rear seat belt and rear seat are covered, and the integration of the power battery installation plate 4 is improved.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A power battery installation structure comprising:
    a rear longitudinal beam;
    a lower crossbeam connected to the rear longitudinal beam by respective ends of the lower crossbeam;
    an upper crossbeam connected to the rear longitudinal beam by respective ends of the upper crossbeam, the upper crossbeam and the lower crossbeam being arranged in sequence in a direction from a front to a rear of a vehicle; and
    a power battery installation plate disposed below the upper crossbeam and connected to the upper crossbeam, a rear end of the power battery installation plate being connected to the lower crossbeam;
    wherein the power battery installation plate comprises a mounting surface facing a rear and lower side of the vehicle, and the mounting surface defines a mounting hole configured for mounting a power battery.

2. The power battery installation structure according to claim 1, wherein a protrusion and an inner cavity are provided on the power battery installation plate by recessing the power battery installation plate downward, and the mounting surface is a side surface of the protrusion.

3. The power battery installation structure according to claim 2, wherein a reinforcing plate is provided inside the mounting hole, and the reinforcing plate is attached to an inner wall of the inner cavity.

4. The power battery installation structure according to claim 1, wherein the power battery installation plate defines a mounting hole, and a flange nut is connected inside the mounting hole, and the flange nut is coaxially with the mounting hole.

5. The power battery installation structure according to claim 4, wherein a reinforcing rib is provided on the power battery installation plate, the reinforcing rib extends from the mounting hole to the lower crossbeam.

6. The power battery installation structure according to claim 1, wherein mounting points configured for mounting a rear seat belt and/or a rear seat are provided on the power battery installation plate.

7. The power battery installation structure according to claim 1, wherein longitudinal cross-sections of the upper crossbeam and the lower crossbeam are Ω-shaped.

8. The power battery installation structure according to claim 1, wherein the lower crossbeam is connected to connecting plates by the respective ends of the lower crossbeam, and the lower crossbeam is connected to the rear longitudinal beam by the connecting plates.

9. A vehicle comprising:
    a power battery installation structure comprising:
        a rear longitudinal beam;
        a lower crossbeam connected to the rear longitudinal beam by respective ends of the lower crossbeam;
        an upper crossbeam connected to the rear longitudinal beam by respective ends of the upper crossbeam, the upper crossbeam and the lower crossbeam being arranged in sequence in a direction from a front to a rear of a vehicle; and
        a power battery installation plate disposed below the upper crossbeam and connected to the upper crossbeam, a rear end of the power battery installation plate being connected to the lower crossbeam;
    wherein the power battery installation plate comprises a mounting surface facing a rear and lower side of the vehicle, and the mounting surface defines a mounting hole configured for mounting a power battery.

10. The vehicle according to claim 9, wherein a protrusion and an inner cavity are provided on the power battery installation plate by recessing the power battery installation plate downward, and the mounting surface is a side surface of the protrusion.

11. The vehicle according to claim 10, wherein a reinforcing plate is provided inside the mounting hole, and the reinforcing plate is attached to an inner wall of the inner cavity.

12. The vehicle according to claim 9, wherein the power battery installation plate defines a mounting hole, and a flange nut is connected inside the mounting hole, and the flange nut is coaxially with the mounting hole.

13. The vehicle according to claim 12, wherein a reinforcing rib is provided on the power battery installation plate, the reinforcing rib extends from the mounting hole to the lower crossbeam.

14. The vehicle according to claim 9, wherein mounting points configured for mounting a rear seat belt and/or a rear seat are provided on the power battery installation plate.

15. The vehicle according to claim 9, wherein longitudinal cross-sections of the upper crossbeam and the lower crossbeam are Ω-shaped.

16. The vehicle according to claim 9, wherein the lower crossbeam is connected to connecting plates by the respective ends of the lower crossbeam, and the lower crossbeam is connected to the rear longitudinal beam by the connecting plates.

* * * * *